United States Patent [19]

Mundlos et al.

[11] 3,923,793

[45] Dec. 2, 1975

[54] HYDROXYNAPTHOLDEHIDE MONOAZOMETHINE HETEROCYCLIC AMINE DYESTUFFS

[75] Inventors: Eberhard Mundlos, Heusenstamm; Theodor Papenfuhs, Frankfurt am Main, both of Germany

[73] Assignee: Hoechst Aktiengesellschaft, Frankfurt, Germany

[22] Filed: Feb. 11, 1974

[21] Appl. No.: 441,354

[30] Foreign Application Priority Data
Feb. 15, 1973 Germany............................ 2307341

[52] U.S. Cl. ... 260/240 F; 260/240 G; 260/251 QA; 260/309.7; 260/50 SE; 260/553; 260/558 R; 260/556 B; 260/566 R
[51] Int. Cl.²...............C07D 235/04; C07D 239/72; C07C 39/14
[58] Field of Search ..................... 260/240 F, 240 G

[56] References Cited
UNITED STATES PATENTS
2,739,963  3/1956  Marschall....................... 260/240 F
FOREIGN PATENTS OR APPLICATIONS
1,505,360  11/1967  France............................ 260/240 G

*Primary Examiner*—Allen B. Curtis
*Attorney, Agent, or Firm*—Connolly and Hutz

[57] ABSTRACT

A water-insoluble monoazomethine dyestuff of the formula

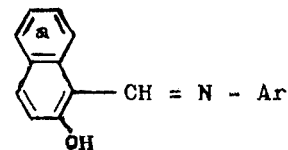

wherein Ar is an aromatic or heterocyclic radical which contains at least one substituted sulfonic acid amide group, an optionally substituted carboxylic acid amide, acylamino, sulfonylamino, urea, carboxylic acid or laked sulfonic acid group or a —NHCO— group contained in a heterocyclic ring, and wherein the benzene nucleus *a* may contain substituents which are valuable pigments, especially suitable for printing pastes.

They may also be used for the pigmentation of high-molecular organic material, for example of cellulose ethers and esters, polyamides, polyurethanes or polyesters, acetyl cellulose, nitro cellulose and natural or synthetic resins, for polyolefins, rubber, casein, silicon and silicon resins, individually or in mixture with one another.

The new pigments are characterized by high fastness properties and especially have a considerably improved fastness to light and to solvents.

4 Claims, No Drawings

HYDROXYNAPTHOLDEHIDE MONOAZOMETHINE HETEROCYCLIC AMINE DYESTUFFS

The present invention relates to novel water-insoluble monoazomethine dyestuffs, their preparation and their use.

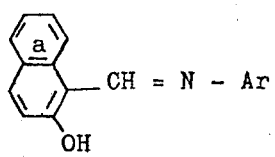   I wherein Ar represents an aromatic or heterocyclic radical which contains at least one substituted sulfonic acid amide group, an optionally substituted carboxylic acid amide group, an acylamino group, sulfonylamino, urea, carboxy or laked sulfo group or a —NHCO— group which is contained in a heterocyclic ring and wherein the benzene nucleus a may contain substituents.

The dyestuffs are prepared by condensing one mol of one or several amines of the formula II

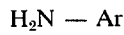  II in which Ar has the above meaning, with one mol of one or several compounds of the formula III

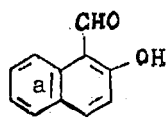  III wherein $a$ is as defined above.

By this way also mixtures of monoazomethine dyestuffs may be obtained.

The condensation of 1 mol of a diamine of the formula II with a mol of a compound of the formula III can be effected in a neutral or acidic, if desired, water-containing medium or in an organic solvent, such as an alcohol, an aliphatic carboxylic acid, for example acetic acid, dimethyl-formamide, xylene, chlorobenzene, o-dichlorobenzene, nitro-benzene. It generally proceeds quickly with a quantitative yield at a temperature of 50° to 100°C. It may be useful to operate in a solvent or in a mixture of solvents at an elevated temperature, for example at 150°C or even at a higher temperature, and to effect at the same time an azeotropic distillation of the water set free by condensation.

The 1-naphthaldehydes of the formula III used as starting compounds may be obtained according to known methods, for example by reacting the corresponding 2-hydroxy-naphthalenes with chloroform in an aqueous or aqueous alcoholic medium in the presence of sodium hydroxide solution or by reacting the 2-hydroxy-naphthalenes with hexamethylene-tetramine and formaldehyde in the presence of acetic acid and/or the anhydride thereof and, if desired, mineral acid (se German Patent Specification No. 952,629).

The benzene radical $a$ may contain further substituents, for example halogen atoms such as chlorine or bromine atoms, alkyl groups such as methyl, ethyl or propyl groups, alkoxy groups such as methoxy, ethoxy or propoxy groups, nitro, hydro oxy, cyano groups, optionally substituted sulfonic acid amide or carboxylic acid amide groups, alkylsulfone, arylsulfone or laked sulfonic acid groups.

Aromatic or heterocyclic amines of the formula II are especially aminobenzamides, aminosulfamides, aminophenyl-ureas, aminobenzoyl-ureas, aminobenzimidazolones, aminoquinazolines, aminoindazolenes and aminoquinoxalines besides other cyclic carbonamides as well as monoacyl-phenylene-diamines which may be further substituted, for example nitro, alkyl, halogen, alkoxy, carboxylic acid ester groups, hydroxy or cyano groups.

Furthermore, there may be used aminobenzoic acids, aminobenzenesulfonic acids, aminonaphthoic acids, aminonaphthalenesulfonic acids and heterocyclic aminocarboxylic or amino-sulfonic acids, which may be further substituted, whereby carboxylic acids are preferably available in a free form, sulfonic acids as alkaline earth metals.

Especially interested examples of this novel compounds are dyestuffs which correspond to the general formula (III)

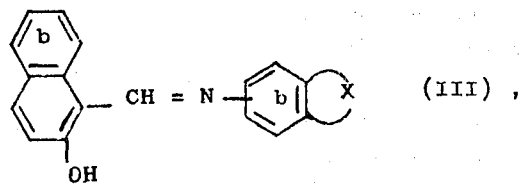  (III)

wherein X is a radical of the formula

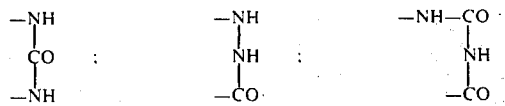

or of the formula —NH—CO—CO—NH— and the nuclei $b$ may contain identical or different substituents and the substituents are preferably chlorine and bromine atoms, alkyl groups having 1 to 4 carbon atoms, alkoxy groups of 1 to 4 carbon atoms, nitro, cyano, hydroxy, carbonamide, sulfonamide and laked sulfonic acid groups, among those especially the dyestuffs described in the following Example 2 and in the Examples 26 and 28 of the Table.

The new dyestuffs are valuable pigments which are especially suitable for printing pastes. They may also be used for the pigmentation of high-molecular organic material, for example of cellulose ethers and esters, polyamides, polyurethanes or polyesters, acetyl cellulose, nitro cellulose, natural or synthetic resins, for example aminoplastics, especially urea- and melamine-formaldehyde resins, alkyd resins, phenoplastics, polycarbonates; polyolefins such as polyethylene or polypropylene, polystyrene, polyvinyl chloride, polyacrylonitrile, polyacrylic acid esters, rubber, casein, silicon and silicon resins, individually or in mixture with one another. It is not important if the high-molecular compounds mentioned are available as plastic masses, melts or in the form of spinning solutions, lacquers or printing pastes. According to the use, it may be advantageous to apply the new pigments as toners or in the form of preparations. The new pigments are characterized by high fastness properties.

In contradistinction to comparable dyestuffs prepared from 2 mols 2-hydroxy-1-naphthaldehyde and 1 mol of an aromatic diamine, as they are known from "Journal fur praktische Chemie", vol. 149, page 217 (1937) and US-Patent Specification No. 2,405,886, the dyestuffs according to the invention have a considerably improved fastness to light and to solvents.

The following Examples illustrate the invention. Parts are by weight, unless stated otherwise.

EXAMPLE 1

17.2 Parts of 2-hydroxy-1-naphthaldehyde were dissolved in 200 parts of glacial acetic acid at 85°–90°C. 24.2 Parts of 3-amino-4-methoxybenzanilide were introduced, the whole was stirred for 3 hours at 90°C, cooled to 40°C, filtered, washed neutral and dried at 60°C. 36.7 Parts of a dyestuff of the formula

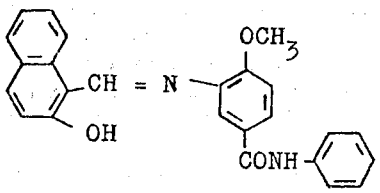

were obtained which was very suitable for preparing yellow intaglio printing inks stable in storage, having a high tinctorial strength, a pure shade and excellent rheological properties.

If instead of 3-amino-4-methoxybenzanilide corresponding amounts of the 3-amino-4-methoxybenzo-(2'-methyl-3'-chloro) anilide were used, a similar pigment having comparable properties was obtained.

EXAMPLE 2

172 Parts of 2-hydroxy-1-naphthaldehyde and 155 parts of 5-amino-benzimidazolone were ground in 3000 parts of water for four hours with exclusion of the air (i.e. under nitrogen) with a dispersing agitator (saw teeth agitator). During this time the temperature was increased continuously from 20° to 60°C. Then the mixture was suction-filtered, washed for a short time with water and dried. 300 Parts of a pure yellow pigment of the formula

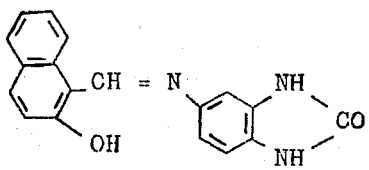

were obtained. The pigment was preferably used for coloring plastics and for preparing printing pastes. The colorations obtained were distinguished by a very good fastness to light and a good fastness to use.

If instead of 5-aminobenzimidazolones identical amounts of 6-aminoindazolone werre used, the corresponding dyestuff was obtained with the same yield and quality, but with a redder shade.

EXAMPLE 3

17.2 Parts of 2-hydroxy-1-naphthaldehyde were dissolved at 90°C in 300 parts of glacial acetic acid, 17.3 parts of aniline-3-sulfonic acid were introduced, and the whole was stirred for 5 hours at 90°C. The dyestuff solution obtained was poured, while using a turbine, within 30 minutes, into a solution of 50 parts of barium chloride dihydrate in 1000 parts of water, which contained 2 parts of an anionic wetting agent. Stirring was continued for 1 hour at 40°–45°C, the dyestuff precipitated of the formula

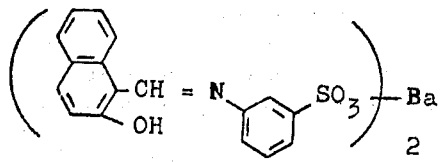

was suction-filtered, washed neutral and dried. 28 Parts of a yellow pigment fast to migration was obtained which was very suitable for coloring plastics and plastic masses.

If instead of the aniline-3-sulfonic acid equivalent amounts of aniline-2-sulfonic acid or 1-naphthylamino-8-sulfonic acid were used and the reaction was continued in analogous manner, the corresponding dyestuffs were obtained with similar yields and fastness properties.

EXAMPLE 4

17.2 Parts of 2-hydroxy-1-naphthaldehyde were dissolved in 250 parts of isopropanol at 50°C. Within 30 minutes, a solution of 30.8 parts of 4-amino-2,5-dimethoxy-benzenesulfoanilide in 95 parts of dimethylformamide was added, the mixture was stirred for 2 hours at 70°C, then for 2 hours at 30°C, the dyestuff of the formula

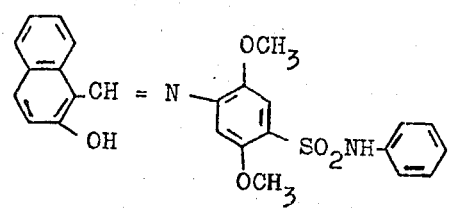

which had precipitated was suction-filtered, washed with isopropanol, then with water and dried at 80°C. 45.2 Parts of a yellow orange pigment were obtained which was distinguished by an especially good stability in storage and a good rheology in printing pastes.

When replacing the 2-hydroxy-1-naphthaldehyde was replaced by corresponding amounts of 6-methoxy-2-hydroxy-1-naphthaldehyde, a dyestuff was obtained having a higher tinctorial strength and a redder shade, the other properties and fastnesses being comparable.

EXAMPLE 5

17.2 Parts of 2-hydroxy-1-naphthaldehyde, 26.1 parts of 4-amino-3-chlorodiphenyl-urea and 100 parts of chlorobenzene were heated, while stirring, to 170°C, whereby the water formed by condensation was removed over a separator. After 3 hours the separation of water was finished. The total amount of chlorobenzene was blown off with direct steam, the aqueous suspension of the dyestuff of the formula

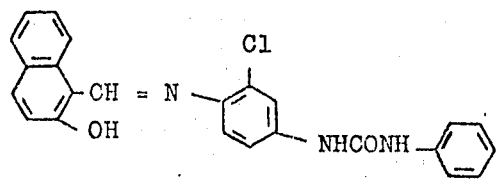

was suction-filtered hot, washed with water and dried. 40 Parts of a yellowish red pigment were obtained which was very suitable for preparing plastics colorations and printing pastes.

If instead of the diphenyl urea mentioned aliquote parts of a monophenyl-urea were used, comparable dyestuffs having a somewhat higher tinctorial strength were obtained.

The following Table contained further dyestuffs of the formula I according to the invention have similar fastnesses and similar technical properties:

| EXAMPLE | Substituent in a | Ar | Shade |
|---|---|---|---|
| 6 | — |  | yellow |
| 7 | — |  | yellow |
| 8 | — |  | yellow |
| 9 | — |  | yellow |
| 10 | — |  | reddish yellow |
| 11 | — |  | yellow |
| 12 | — |  | yellow |
| 13 | — |  | yellow |
| 14 | — |  | yellow |
| 15 | — |  | orange |
| 16 | — |  | reddish yellow |
| 17 | — |  | reddish yellow |
| 18 | — |  | red |

-continued

| EXAMPLE | Substituent in a | Ar | Shade |
|---|---|---|---|
| 19 | — | 4-methyl-3-(NHCONH$_2$)phenyl | reddish yellow |
| 20 | — | 4-methyl-3-(NHCONHC$_6$H$_5$)phenyl | orange |
| 21 | — | 4-methoxy-3-(NHCONHC$_6$H$_5$)phenyl | red |
| 22 | — | 2,5-dimethyl-4-(NHCONHC$_6$H$_5$)phenyl | yellowish red |
| 23 | — | 3-(CONHCONH$_2$)phenyl | yellow |
| 24 | — | 3-methyl-4-(CONHCONH$_2$)phenyl | yellow |
| 25 | — | 3-phenoxy-4-(CONHCONH$_2$)phenyl | yellow |
| 26 | — | 5-chloro-benzimidazoline-2,3-dione-yl | yellow |
| 27 | — | 7-chloro-benzimidazoline-2,3-dione-yl | yellow |
| 28 | — | 2-(NH–C(=O)–CH$_2$–NH)–C$_6$H$_4$–CONH$_2$ | yellow |
| 29 | — | 3-methyl-1,4-bis(CONH$_2$)phenyl | yellow |
| 30 | — | 3,5-bis(CONH$_2$)phenyl | yellow |

-continued

| EXAMPLE | Substituent in a | Ar | Shade |
|---|---|---|---|
| 31 | — | 4-(benzamido)phenyl linked to benzimidazolone (NH-CO-NH) | yellow |
| 32 | 6—OCH$_3$ | phenyl-NH-C(=O)-NH (benzimidazolone type) | yellow |
| 33 | ditto | phenyl-CO-NH-CH$_2$-NH | yellow |
| 34 | ditto | phenyl with NH-C(=O)-C(=O)-NH (quinoxalinedione) | yellow |
| 35 | ditto | 4-methyl-3-methylphenyl-NHSO$_2$-phenyl | yellow |
| 36 | ditto | 2,5-dimethoxy-4-methylphenyl-NHSO$_2$-phenyl | yellow |
| 37 | 6—Br | 3-chlorophenyl with NH-C(=O)-NH (benzimidazolone) | yellow |
| 38 | ditto | 3-chlorophenyl with NH-C(=O)-C(=O)-NH | yellow |
| 39 | ditto | phenyl-3,5-bis(CONHCH$_3$) | yellow |
| 40 | ditto | 3-methyl-4-methoxyphenyl-SO$_2$NHCH$_2$CONH$_2$ | yellow |
| 41 | 6—Cl | phenyl with NH-C(=O)-NH (benzimidazolone) | yellow |
| 42 | ditto | 3-methyl-4-methoxyphenyl-CONHCONH$_2$ | yellow |
| 43 | 6—SO$_2$NH$_2$ | phenyl with NH-C(=O)-NH (benzimidazolone) | yellow |
| 44 | ditto | 3-methylphenyl-CONH$_2$ with 4-CONH$_2$ | yellow |

-continued

| EXAMPLE | Substituent in a | Ar | Shade |
|---|---|---|---|
| 45 | 6—SO$_2$NH$_2$ | (2,4-dimethoxy-5-methylphenyl)-NHCO-phenyl | yellow |
| 46 | ditto | -C$_6$H$_4$-NHCOCH$_3$ | yellow |
| 47 | 6—OH | benzimidazolone (o-phenylene-NH-CO-NH) | yellow |
| 48 | 6—CN | ditto | yellow |
| 49 | ditto | -C$_6$H$_4$-NHCOCH$_2$-C$_6$H$_5$ | yellow |
| 50 | 6—CONH$_2$ | benzimidazolone | yellow |
| 51 | ditto | phenyl-3,5-di-CONH$_2$ | yellow |
| 52 | ditto | 4-Cl-3-CONH$_2$-phenyl-CONHCONH$_2$ | yellow |

We claim:
1. A water-insoluble dyestuff of the formula

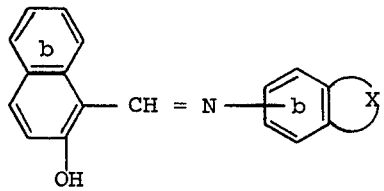

in which X is a radical of the formula

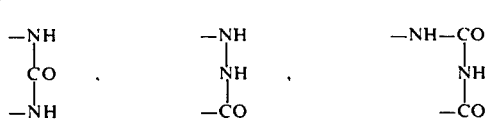

or of the formula —NH — CO — CO — NH — and the nuclei b may contain identical or different substituents and the substituents are chlorine, bromine, alkyl groups having 1 to 4 carbon atoms, alkoxy groups having 1 to 4 carbon atoms, nitro, cyano, hydroxy, carbonamide, sulfonamide and laked sulfonic acid groups.

2. The dyestuff as claimed in claim 1 of the formula

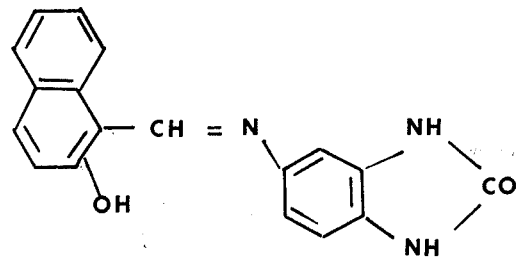

3. The dyestuff as claimed in claim 1 of the formula

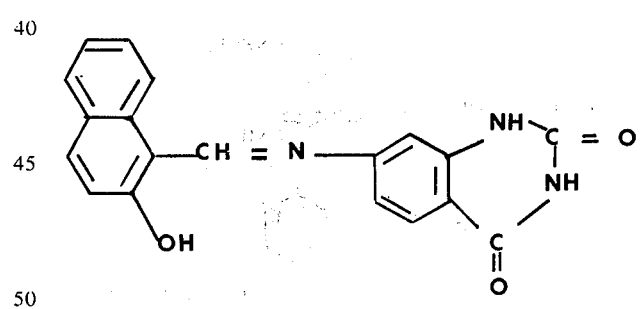

4. The dyestuff as claimed in claim 1 of the formula

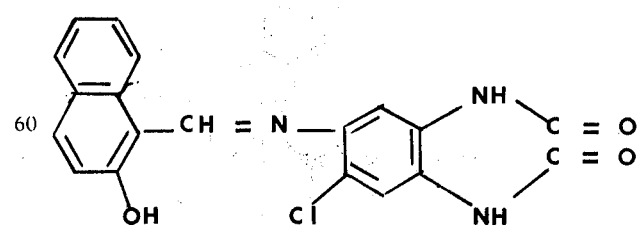

* * * * *